United States Patent
Kim et al.

(10) Patent No.: US 10,261,390 B2
(45) Date of Patent: Apr. 16, 2019

(54) LASER BEAM STEERING DEVICE AND SYSTEM INCLUDING THE SAME

(71) Applicant: SAMSUNG ELECTRONICS CO., LTD., Suwon-si (KR)

(72) Inventors: Sunil Kim, Osan-si (KR); Duhyun Lee, Yongin-si (KR); Changbum Lee, Seoul (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/686,935

(22) Filed: Aug. 25, 2017

(65) Prior Publication Data

US 2018/0059507 A1    Mar. 1, 2018

(30) Foreign Application Priority Data

Aug. 26, 2016 (KR) .................. 10-2016-0109550

(51) Int. Cl.
*G02F 1/31* (2006.01)
*G02F 1/295* (2006.01)
*G02F 1/313* (2006.01)

(52) U.S. Cl.
CPC .......... *G02F 1/3137* (2013.01); *G02F 1/2955* (2013.01); *G02F 2001/311* (2013.01); *G02F 2201/06* (2013.01)

(58) Field of Classification Search
CPC ............ G02B 6/12; G02B 6/00; G02F 1/3137
USPC .......................................................... 385/8
See application file for complete search history.

(56) References Cited

U.S. PATENT DOCUMENTS

| | | | |
|---|---|---|---|
| 3,838,908 A | | 10/1974 | Channin |
| 5,544,268 A | * | 8/1996 | Bischel ................ G02F 1/011 385/16 |
| 5,586,206 A | * | 12/1996 | Brinkman ............ G02F 1/2955 385/16 |
| 5,630,004 A | * | 5/1997 | Deacon ................ G02F 1/011 385/10 |
| 5,715,337 A | * | 2/1998 | Spitzer ................ G02B 27/017 359/223.1 |
| 5,802,223 A | * | 9/1998 | Nashimoto ............ G02F 1/295 385/2 |

(Continued)

FOREIGN PATENT DOCUMENTS

| | | |
|---|---|---|
| JP | 2005-208650 A | 8/2005 |
| JP | 2011-215486 A | 10/2011 |

(Continued)

OTHER PUBLICATIONS

Communication issued by the European Patent Office dated Jan. 15, 2018 in counterpart European Patent Application No. 17186489.5.

(Continued)

*Primary Examiner* — Kaveh C Kianni
(74) *Attorney, Agent, or Firm* — Sughrue Mion, PLLC

(57) ABSTRACT

A laser beam steering device and a system including the same are provided. The laser beam steering device includes a waveguide through which a laser beam passes, and a cladding layer disposed on the waveguide. The cladding layer has a refractive index which changes according to an electrical signal applied thereto and thus a phase of a laser beam passing through the waveguide may be changed.

20 Claims, 9 Drawing Sheets

(56) References Cited

U.S. PATENT DOCUMENTS

| | | | | |
|---|---|---|---|---|
| 5,825,525 A * | 10/1998 | Harwit | | B82Y 20/00 359/248 |
| 5,835,458 A * | 11/1998 | Bischel | | G11B 7/122 369/112.27 |
| 5,911,018 A * | 6/1999 | Bischel | | G02F 1/011 385/11 |
| 6,545,759 B1 * | 4/2003 | Hartman | | G01N 21/45 356/477 |
| 6,567,573 B1 * | 5/2003 | Domash | | G02B 6/12007 385/10 |
| 6,748,002 B2 * | 6/2004 | Shveykin | | H01S 5/10 372/45.01 |
| 7,043,132 B2 | 5/2006 | Aoki et al. | | |
| 7,923,273 B2 * | 4/2011 | Dutta | | G02B 6/12002 257/E21.022 |
| 8,463,080 B1 * | 6/2013 | Anderson | | G02F 1/1396 385/3 |
| 9,366,938 B1 * | 6/2016 | Anderson | | G02F 1/2955 |
| 9,829,766 B2 * | 11/2017 | Anderson | | G02F 1/295 |
| 9,880,443 B2 * | 1/2018 | Anderson | | G02F 1/29 |
| 9,885,892 B2 * | 2/2018 | Anderson | | G02F 1/295 |
| 2003/0160034 A1 * | 8/2003 | Filgas | | B23K 26/0648 219/121.68 |
| 2003/0161022 A1 * | 8/2003 | Lazarev | | G02F 1/035 359/245 |
| 2003/0161375 A1 * | 8/2003 | Filgas | | B23K 26/0648 372/66 |
| 2004/0096179 A1 * | 5/2004 | Bintz | | G02B 6/132 385/142 |
| 2005/0047705 A1 * | 3/2005 | Domash | | G02F 1/011 385/10 |
| 2005/0254752 A1 * | 11/2005 | Domash | | G02F 1/313 385/37 |
| 2005/0265403 A1 * | 12/2005 | Anderson | | H01S 5/143 372/20 |
| 2005/0271325 A1 * | 12/2005 | Anderson | | G02F 1/295 385/40 |
| 2007/0133649 A1 * | 6/2007 | Kwon | | H01S 5/141 372/102 |
| 2007/0223552 A1 * | 9/2007 | Muendel | | G02B 6/12004 372/50.12 |
| 2011/0243491 A1 | 10/2011 | Hashimoto | | |
| 2014/0023321 A1 * | 1/2014 | Lu | | G02B 6/10 385/40 |
| 2016/0091675 A1 | 3/2016 | Barwicz et al. | | |
| 2016/0091772 A1 | 3/2016 | Okamoto | | |
| 2017/0153530 A1 * | 6/2017 | Anderson | | G02F 1/295 |
| 2017/0192264 A1 * | 7/2017 | Anderson | | G02F 1/1326 |
| 2017/0212404 A1 * | 7/2017 | Anderson | | G02F 1/29 |

FOREIGN PATENT DOCUMENTS

| | | |
|---|---|---|
| JP | 2015-187636 A | 10/2015 |
| KR | 10-2012-0077417 A | 7/2012 |

OTHER PUBLICATIONS

Weihua Guo et al., "InP Photonic Integrated Circuit with On-chip Monitors for Optical Beam Steering", Semiconductor Laser Conference (ISLC), 2012 23rd IEEE International, Oct. 7, 2012, pp. 16-17, XP032471139.

Volker J. Sorger et al., "Ultra-compact silicon nanophotonic modulator with broadband response", Nanophotonics, Jan. 1, 2012, pp. 17-22, vol. 1, No. 1, XP55319247, DOI: 10.1515/nanoph-2012-0009.

Viktoriia E. Babicheva et al., "Transparent conducting oxides for electro-optical plasmonic modulators", Nanophotonics, Jun. 16, 2015, pp. 165-185, vol. 4, No. 1, XP55438194, DOI: 10.1515/nanoph-2015-0004.

* cited by examiner

LASER BEAM STEERING DEVICE AND SYSTEM INCLUDING THE SAME

CROSS-REFERENCE TO RELATED APPLICATION

This application claims priority from Korean Patent Application No. 10-2016-0109550, filed on Aug. 26, 2016 in the Korean Intellectual Property Office, the disclosure of which is incorporated herein in its entirety by reference.

BACKGROUND

1. Field

The present disclosure relates to a laser beam steering device and a system including the same.

2. Description of the Related Art

A laser beam may be steered toward a desired position by a method of mechanically rotating a laser irradiation portion or a method using interference of a bundle of laser beams emitted from a plurality of unit cells or a plurality of waveguides through optical phased array (OPA) technology. OPA technology may steer a laser beam by electrically or thermally controlling the unit cells or the waveguides. The method of mechanically rotating a laser irradiation portion uses a motor or a microelectromechanical system (MEMS), resulting in an increase in volume and cost.

SUMMARY

Example embodiments provide a laser beam steering device and a system including the same.

According to an aspect of an example embodiment, there is provided a laser beam steering device including: a waveguide configured to guide a laser beam which passes through the waveguide; and a cladding layer disposed on the waveguide and having a refractive index which changes according to an electrical signal applied to the cladding layer.

The laser beam steering device may further include a first conductive layer disposed on the waveguide. The cladding layer may be arranged between the waveguide and the first conductive layer. The laser beam steering device may further include an insulating layer disposed between the cladding layer and the first conductive layer.

The laser beam steering device may further include a second conductive layer disposed under the waveguide. The laser beam steering device may further include an insulating layer disposed between the waveguide and the second conductive layer.

The laser beam steering device may further include: a first insulating layer arranged between the cladding layer and the first conductive layer; and a second insulating layer disposed between the waveguide and the second conductive layer.

The laser beam steering device may further include an insulating layer disposed on the cladding layer.

The cladding layer may include: a first cladding layer disposed on an upper surface of the waveguide; and a second cladding layer disposed on a lower surface of the waveguide. The cladding layer may surround the waveguide.

The cladding layer may include an oxide semiconductor. The waveguide may include silicon or silicon nitride.

According to an aspect of another example embodiment, there is provided a laser beam steering device including: a plurality of modulation units, each of the plurality of modulation units including: a waveguide configured to guide a laser beam which passes through the waveguide; and a cladding layer disposed on the waveguide and having a refractive index which changes according to an electrical signal applied to the cladding layer.

The plurality of modulation units may be one-dimensionally arranged on a substrate. The plurality of modulation units may be configured to steer the laser beam by forming a phase profile changing according to time.

The laser beam steering device may further include a first conductive layer disposed over the waveguide.

The laser beam steering device may further include a second conductive layer disposed under the waveguide. The laser beam steering device may further include an insulating layer disposed on the cladding layer.

According to an aspect of another example embodiment, there is provided a system including: a laser light source configured to emit a laser beam; a laser beam steering device configured to steer the laser beam emitted by the laser light source; and a detector configured to detect the laser beam steered by the laser beam steering device, wherein the laser beam steering device includes a plurality of modulation units, each of the plurality of modulation units including: a waveguide configured to guide the laser beam which passes through the waveguide; and a cladding layer disposed on the waveguide and having a refractive index which changes according to an electrical signal applied to the cladding layer.

The laser beam steering device may further include a plurality of beam splitter configured to split the laser beam emitted by the laser light source into a plurality of laser beams and input the plurality of laser beams to the plurality of modulation units.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
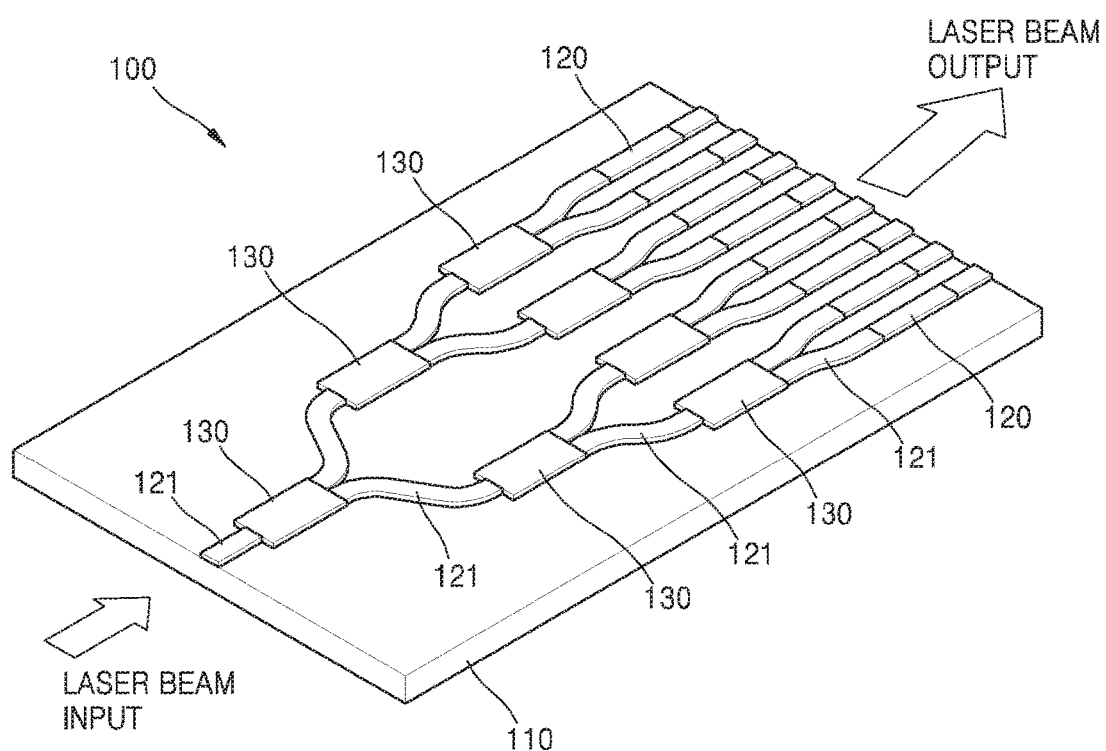
FIG. 1 is a perspective view of a laser beam steering device according to an example embodiment.

Hereinafter, example embodiments are described in detail with reference to the accompanying drawings. In the drawings, like reference numerals denote like elements, sizes or thicknesses of components in the drawings may be exaggerated for clarity convenience of explanation. It will be understood that when a certain material layer is referred to as being "disposed on" a substrate or another layer, it may be disposed directly on the substrate or the other layer, or an intervening layer may be present. In the following embodiments, a material constituting each layer is merely an example, other materials may be used.

Figure 2:
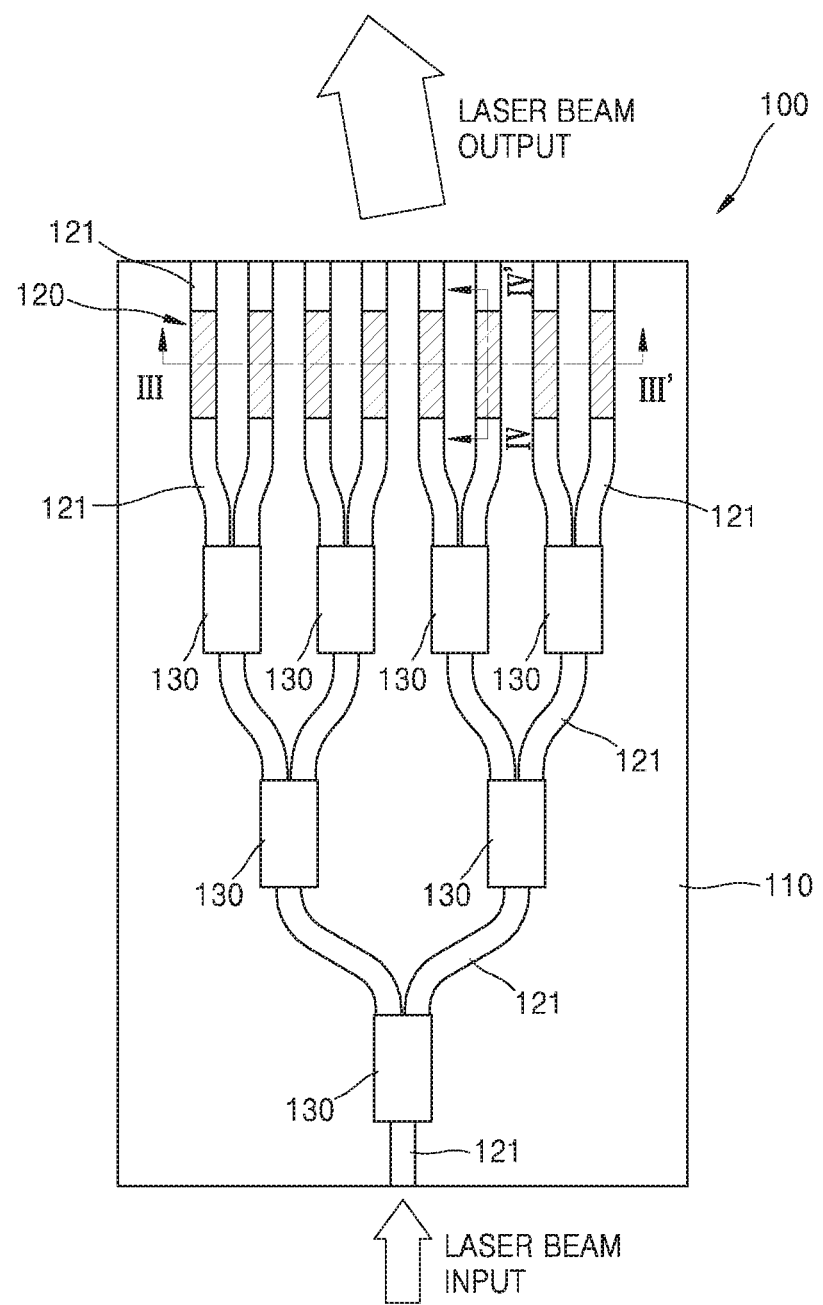
FIG. 2 is a plan view of the laser beam steering device illustrated in FIG. 1.

FIG. 1 is a perspective view of a laser beam steering device 100 according to an example embodiment, and FIG. 2 is a plan view of the laser beam steering device 100 illustrated in FIG. 1.

Referring to FIGS. 1 and 2, the laser beam steering device 100 may include a plurality of waveguides 121, a plurality of beam splitters 130, and a plurality of modulation units 120 on a substrate 110. In addition, a driver may be provided to independently drive the modulation units 120 and may be further arranged on the substrate 110. However, embodiments of the present disclosure are not limited thereto, and the driver may not be arranged on the substrate 110.

A waveguide, on which a laser beam is incident, may be branched into the plurality of waveguides 121 by the beam splitters 130. FIGS. 1 and 2 illustrate an example in which one waveguide 121, on which a laser beam is incident, is branched into eight waveguides 121 by seven beam splitters 130. However, embodiments of the present disclosure are not limited thereto, and the number of beam splitters 130 and the number of waveguides 121 may be variously changed.

The modulation units 120 are respectively disposed on the final waveguides 121 branched by the beam splitters 130. The modulation units 120 may be one-dimensionally arranged on the substrate 110. As described below, the modulation units 120 may change phases of laser beams passing through the waveguides 121.

Figure 3:
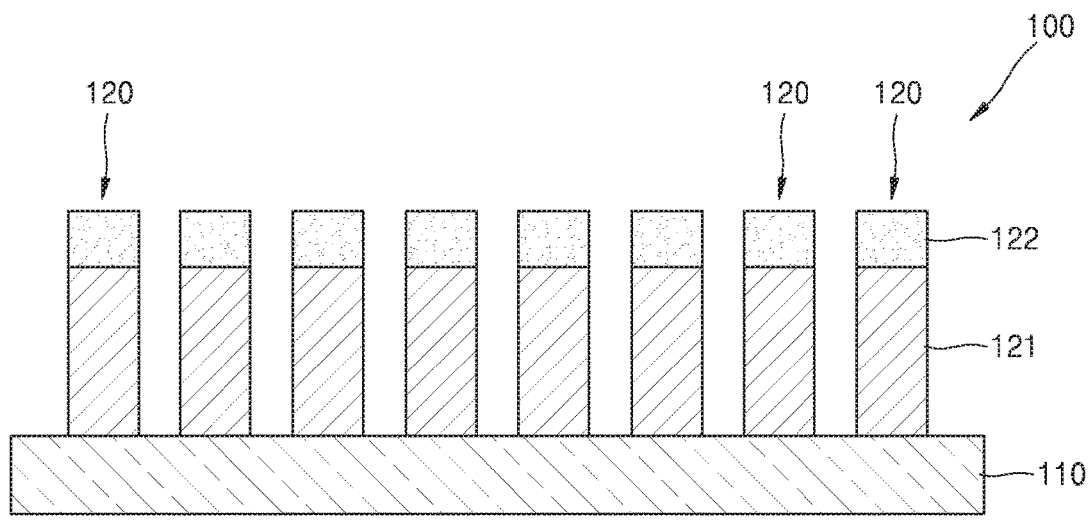
FIG. 3 is a cross-sectional view taken along line III-III' of FIG. 2.
Figure 4:
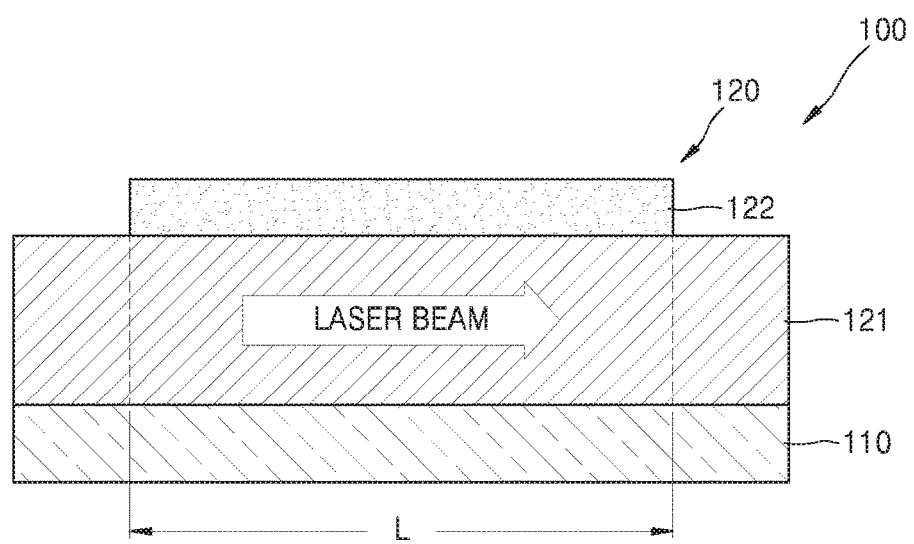
FIG. 4 is a cross-sectional view taken along line IV-IV' of FIG. 2.

FIG. 3 is a cross-sectional view taken along line III-III' of FIG. 2, and FIG. 4 is a cross-sectional view taken along line IV-IV' of FIG. 2.

Referring to FIGS. 3 and 4, the laser beam steering device 100 includes the plurality of modulation units 120. Each of the modulation units 120 may include the waveguide 121 and a cladding layer 122 disposed on the substrate 110.

The substrate 110 may be a silicon substrate. However, this is merely an example and the substrate 110 may include various other materials. The waveguide 121 is disposed on an upper surface of the substrate 110. The waveguide 121 may guide a laser beam that is input thereto, i.e., may be a path through which a laser beam passes. The waveguide 121 may include a semiconductor material. For example, the waveguide 121 may include silicon. However, this is merely an example and the waveguide 121 may include other various materials.

The cladding layer 122 is disposed on an upper surface of the waveguide 121. The cladding layer 122 may be provided for modulating a phase of a laser beam passing through the waveguide 121. To this end, the cladding layer 122 may include a material having a refractive index that changes according to an electrical signal applied to the cladding layer.

The cladding layer 122 may include, for example, an oxide semiconductor. Specifically, the cladding layer 122 may include transparent conductive oxide (TCO) having a refractive index that changes relatively greatly according to an electrical signal applied thereto. For example, the TCO may include at least one selected from indium-tin-oxide (ITO), indium-zinc-oxide (IZO), Ga—In—Zn-oxide (GIZO), Al—Zn-oxide (AZO), Ga—Zn-oxide (GZO), and ZnO. However, embodiments of the present disclosure are not limited thereto. The cladding layer 122 may form a p-n junction structure with the waveguide 121.

In the modulation unit 120 having the above-described structure, when the driver applies an electrical signal (e.g., a voltage) to the cladding layer 122, a carrier density in the cladding layer 122 changes at an interface between the cladding layer 122 and the waveguide 121. The refractive index of the cladding layer 122 changes according to the change in the carrier density. As such, when the refractive index of the cladding layer 122 changes, a phase of a laser beam passing through the waveguide 121 under the cladding layer 122 may be modulated by evanescent wave interference. In FIG. 4, "L" represents a length of a phase modulation section, that is, a length of the modulation unit 120 in a traveling direction of a laser beam.

Referring to the laser beam steering device 100 of FIGS. 1 and 2, to which the modulation units 120 are applied, a laser beam is incident on one waveguide 121 and is emitted through the plurality of waveguides 121 branched by the beam splitters 130. Then, the laser beam may be irradiated toward a specific position by interference of a bundle of laser beams. Since the phases of the laser beams passing through the waveguides 121 are modulated by the modulation units 120, a phase profile of the bundle of finally emitted laser beams is determined, and a traveling direction of the laser beam is determined according to the determined phase profile. Thus, the laser beam may be irradiated toward a desired position.

In order to modulate a phase of a laser beam passing through a waveguide, a method of changing a refractive index of a waveguide itself has been commonly used. Methods of changing a refractive index of a waveguide may include a method using heat and a method using electricity. In the case of the method using heat, the waveguide may be made of various materials, but speed is low and interference between waveguides is severe. Thus, a gap between waveguides has to be greater than or equal to a certain interval, and it is difficult to secure a wide field of view (FOV). In the case of the method using electricity, speed is high and there is no interference between waveguides. Thus, a wide FOV may be obtained. However, since a phase change is small, a long waveguide is required. Since a p-n or p-i-n junction structure is applied, a material for a waveguide is limited to a semiconductor material such as silicon. Accordingly, it may be difficult to steer laser beams having various wavelengths.

In the laser beam steering device 100 according to the present example embodiment, each of the modulation units 120 includes the cladding layer 122, which has a refractive index that changes according to an electrical signal applied thereto, disposed on or around the waveguide 121 so as to modulate the phase of the laser beam passing through the waveguide 121. Accordingly, in the present example embodiment, by changing the refractive index of the cladding layer 122 without changing the refractive index of the waveguide 121 itself, the phase of the laser beam passing through the waveguide 121 may be modulated by evanescent wave interference. Thus, beam loss is small since the refractive index of the waveguide 121 itself is not changed, and laser beams having various wavelengths may be steered since various materials such as silicon or silicon nitride may be used as the material for the waveguide 121. Also, since an electrical signal is used instead of heat, speed is high and a gap between the waveguides 121 may be reduced, thereby securing a wide FOV.

Figure 5A:
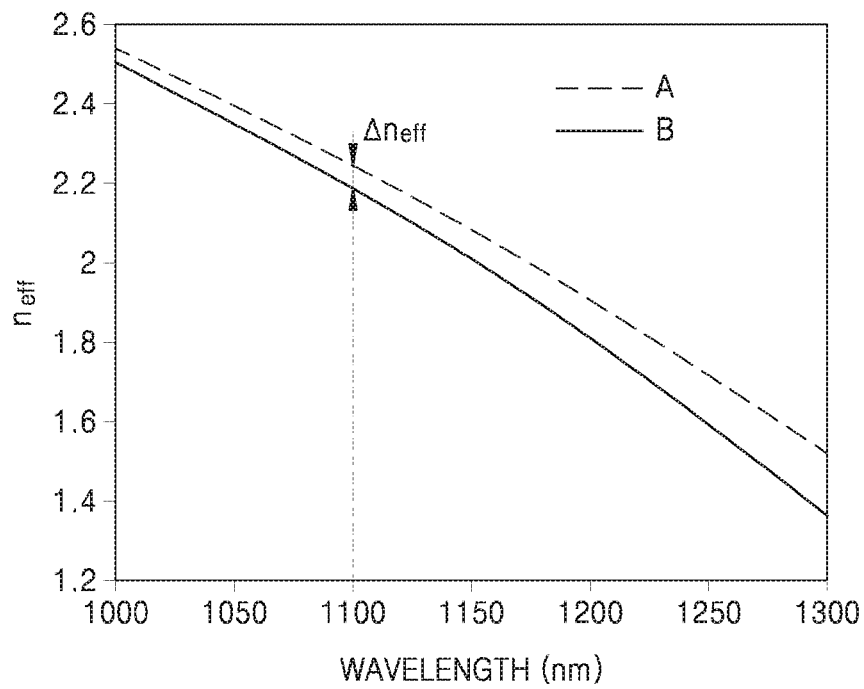
FIG. 5A shows an effective refractive index of a laser beam (TM0 mode) passing through a cladding layer of a modulation unit in the laser beam steering device illustrated in FIG. 1.

FIG. 5A shows an effective refractive index ($n_{eff}$) of the waveguide 121 with respect to wavelength when a laser beam (TM0 mode) passes through the modulation unit 120 of the laser beam steering device 100 illustrated in FIG. 1. A TM mode means a transverse magnetic mode expressing an electromagnetic field in a waveguide when a magnetic field is generated in a direction perpendicular to a traveling direction of the electromagnetic wave. A TM0 mode represents a TM mode having a mode number that is 0.

Figure 5B:
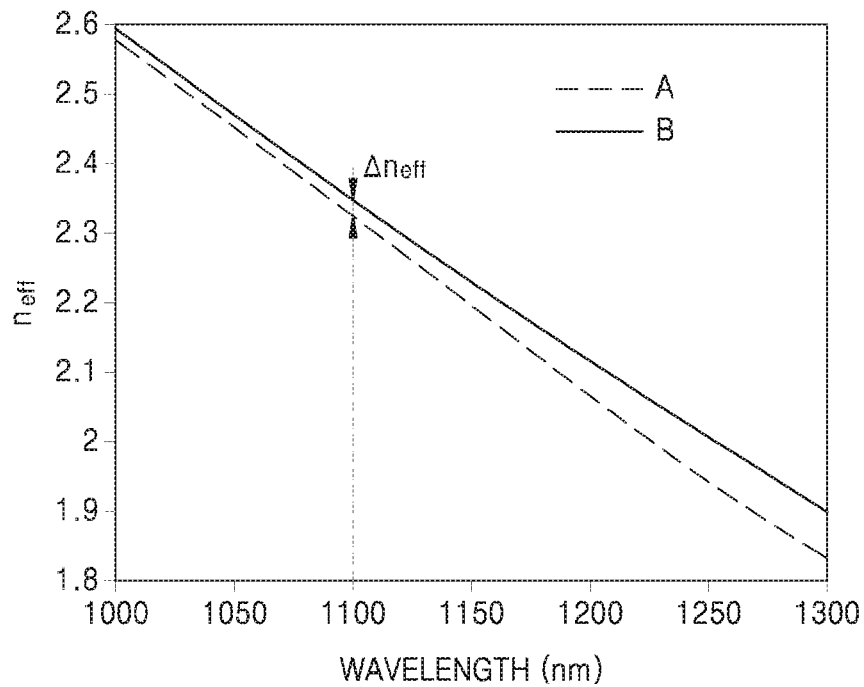
FIG. 5B shows an effective refractive index of a laser beam (TE0 mode) passing through the cladding layer of the modulation unit in the laser beam steering device illustrated in FIG. 1.

FIG. 5B shows an effective refractive index ($n_{eff}$) of the waveguide 121 with respect to wavelength when a laser beam (TE0 mode) passes through the modulation unit 120 of the laser beam steering device 100 illustrated in FIG. 1. A TE mode means a transverse electric mode expressing an electromagnetic field in a waveguide when an electric field is generated in a direction perpendicular to a traveling direction of the electromagnetic wave. A TE0 mode represents a TE mode having a mode number that is 0.

In FIGS. 5A and 5B, the waveguide 121 was made of silicon, and the cladding layer 122 was made of ITO. The effective refractive index ($n_{eff}$) means a refractive index of the waveguide 121 that a laser beam experiences when a voltage is applied to the cladding layer 122 and thus the phase of the laser beam passing through the waveguide 121 is modulated, even though the refractive index of the waveguide 121 does not actually change. In FIGS. 5A and 5B, "A" indicates a case where no voltage is applied to the cladding layer 122, and "B" indicates a case where a voltage of 4 V is applied to the cladding layer 122.

Referring to FIGS. 5A and 5B, in the case of the TM0 mode, a change ($\Delta n_{eff}$) in the effective refractive index at a wavelength of 1,100 nm was about 0.033, and in the case of the TE0 mode, a change ($\Delta n_{eff}$) in the effective refractive index at a wavelength of 1,100 nm was about −0.0122. The change ($\Delta n_{eff}$) in the effective refractive index means a difference between the effective refractive index of the waveguide in the case A where no voltage is applied to the cladding layer 122 and the effective refractive index of the waveguide in the case B where a voltage of 4 V is applied to the cladding layer 122. From the results shown in FIGS. 5A and 5B, it can be seen that, in the case where the cladding layer 122 is made of ITO and a voltage is applied thereto, phase modulation efficiency is improved about 10 times, as compared to the case where the cladding layer 122 is made of silicon. Due to the improvement in the phase modulation efficiency, a phase modulation section may be reduced. For example, in the case of the TM0 mode, the length (L in FIG. 4) of the modulation unit 120 may be reduced to about 15 μm, and in the case of the TE0 mode, the length (L) of the modulation unit 120 may be reduced to about 41 μm.

Figure 6:
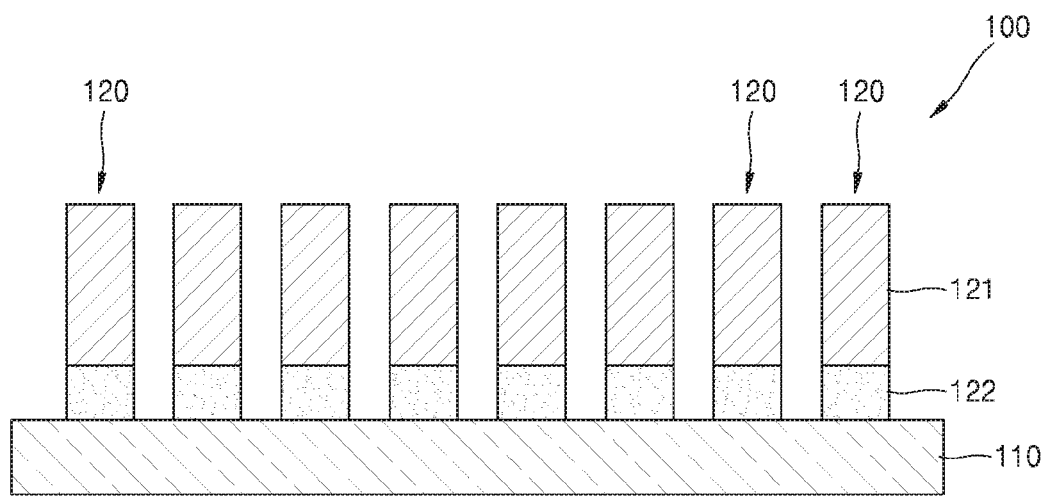
FIG. 6 is a cross-sectional view of a laser beam steering device according to another example embodiment.

FIG. 6 is a cross-sectional view of a laser beam steering device 100 according to another example embodiment. Referring to FIG. 6, a cladding layer 122 may be disposed under a waveguide 121.

Figure 7:
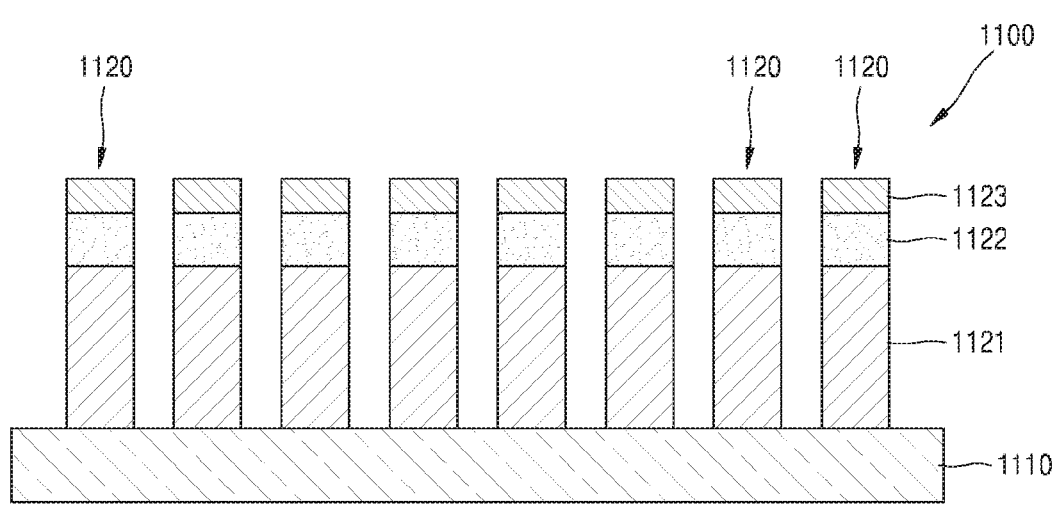
FIG. 7 is a cross-sectional view of a laser beam steering device according to another example embodiment.

FIG. 7 is a cross-sectional view of a laser beam steering device 1100 according to another example embodiment.

Referring to FIG. 7, the laser beam steering device 1100 may include a plurality of modulation units 1120 that are one-dimensionally arranged in parallel on a substrate 1110. Each of the modulation units 1120 may include a waveguide 1121, a cladding layer 1122, and a conductive layer 1123.

The substrate 1110 may be a silicon substrate, but embodiments of the present disclosure are not limited thereto. The waveguide 1121 is a path through which a laser beam passes and may include, for example, a semiconductor material. Specifically, the waveguide 1121 may include silicon, but embodiments of the present disclosure are not limited thereto.

The cladding layer 1122 is disposed on an upper surface of the waveguide 1121. The cladding layer 1122 is provided for modulating a phase of a laser beam passing through the waveguide 1121 and may include a material having a refractive index that changes according to an electric signal applied thereto. The cladding layer 1122 may include, for example, an oxide semiconductor. Specifically, the cladding layer 1122 may include TCO including at least one selected from ITO, IZO, GIZO, AZO, GZO, and ZnO. However, embodiments of the present disclosure are not limited thereto. The cladding layer 1122 may form a p-n junction structure with the waveguide 1121.

The conductive layer 1123 is disposed on an upper surface of the cladding layer 1122. The conductive layer 1123 may serve as an electrode configured to apply a voltage to the cladding layer 1122. The conductive layer 1123 may include, for example, a metal material including at least one selected from Ag, Au, Al, and Pt. However, embodiments of the present disclosure are not limited thereto. The conductive layer 1123 may include, for example, heavily-doped $n^{++}$ Si or low-resistance ITO.

In the modulation unit 1120 having the above-described structure, when a driver applies a voltage to the cladding layer 1122 through the conductive layer 1123, a carrier density in the cladding layer 1122 changes at an interface between the cladding layer 1122 and the waveguide 1121. The refractive index of the cladding layer 1122 changes according to the change in the carrier density. When the refractive index of the cladding layer 1122 changes, a phase of a laser beam passing through the waveguide 1121 between the substrate 1110 and the cladding layer 1122 may be modulated by evanescent wave interference.

Figure 8:
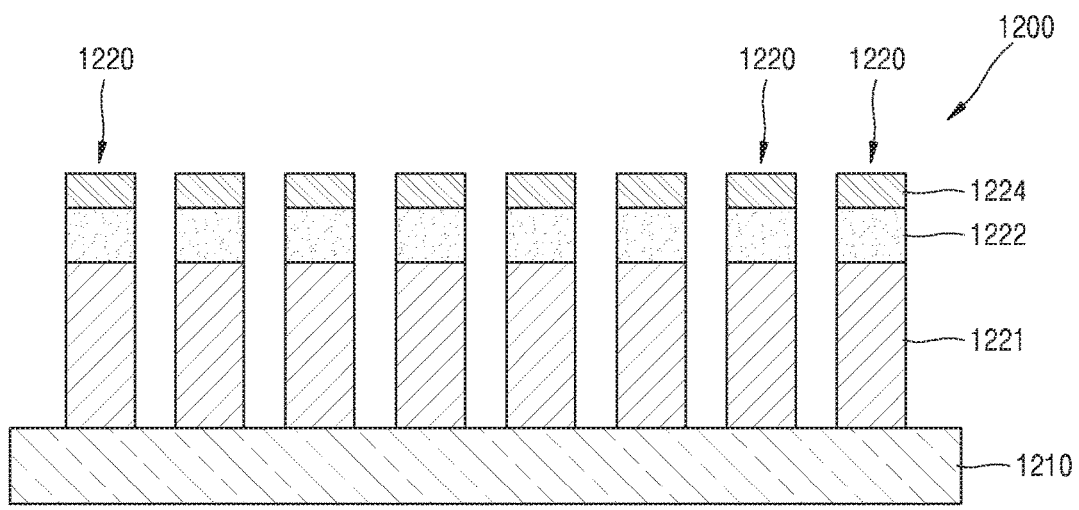
FIG. 8 is a cross-sectional view of a laser beam steering device according to another example embodiment.

FIG. 8 is a cross-sectional view of a laser beam steering device 1200 according to another example embodiment.

Referring to FIG. 8, the laser beam steering device 1200 may include a plurality of modulation units 1220 that are one-dimensionally arranged in parallel on a substrate 1210. Each of the modulation units 1220 may include a waveguide 1221, a cladding layer 1222, and an insulating layer 1224.

The substrate 1210 may be a silicon substrate, but embodiments of the present disclosure are not limited thereto. The waveguide 1221 is a path through which a laser beam passes and may include, for example, a semiconductor material. The cladding layer 1222 is disposed on an upper surface of the waveguide 1221. The cladding layer 1222 is provided for modulating a phase of a laser beam passing through the waveguide 1221 and may include a material having a refractive index that changes according to an electric signal applied thereto. The cladding layer 1222 may include, for example, an oxide semiconductor.

The insulating layer 1224 is disposed on an upper surface of the cladding layer 1222. The insulating layer 1224 may include various types of insulating materials. For example, the insulating layer 1224 may include silicon oxide, silicon nitride, $Al_2O_3$, $ZrO_2$, or $HfO_2$, but embodiments of the present disclosure are not limited thereto. Although an example in which the insulating layer 1224 is disposed on the cladding layer 1222 is illustrated in FIG. 8, example embodiments of the present disclosure are not limited thereto. For example, the insulating layer 1224 may be disposed on the lower surface of the waveguide 1221, or may be disposed on the lower surface of the waveguide 1221 and on the upper surface of the cladding layer 1222.

Figure 9:
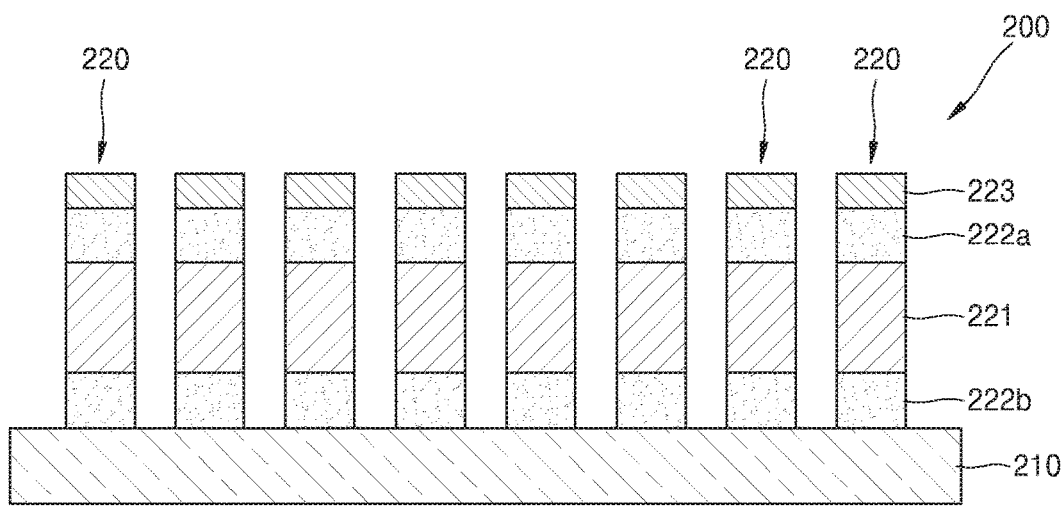
FIG. 9 is a cross-sectional view of a laser beam steering device according to another example embodiment.

FIG. 9 is a cross-sectional view of a laser beam steering device 200 according to another example embodiment.

Referring to FIG. 9, the laser beam steering device 200 may include a plurality of modulation units 220 that are one-dimensionally arranged in parallel on a substrate 210. Each of the modulation units 220 may include a waveguide 221, first and second cladding layers 222a and 222b, and a conductive layer 223 on the substrate 210. The first and second cladding layers 222a and 222b are respectively disposed on an upper surface of the waveguide 221 and a lower surface of the waveguide 221, and the conductive layer 223 is disposed on the upper surface of the first cladding layer 222a.

The substrate 210 may be a silicon substrate, but embodiments of the present disclosure are not limited thereto. The waveguide 221 is a path through which a laser beam passes and may include, for example, a semiconductor material. Specifically, the waveguide 221 may include silicon, but embodiments of the present disclosure are not limited thereto.

The first and second cladding layers 222a and 222b are provided for modulating a phase of a laser beam passing through the waveguide 221 and may include a material having a refractive index that changes according to an electric signal applied thereto.

The first and second cladding layers 222a and 222b may include, for example, an oxide semiconductor. Specifically, the first and second cladding layers 222a and 222b may include TCO including at least one selected from ITO, IZO, GIZO, AZO, GZO, and ZnO. However, embodiments of the present disclosure are not limited thereto. The first and second cladding layers 222a and 222b may form a p-n junction structure with the waveguide 221.

The conductive layer 223 is disposed on an upper surface of the first cladding layer 222a. The conductive layer 223 may include, for example, a metal material including at least one selected from Ag, Au, Al, and Pt. However, embodiments of the present disclosure are not limited thereto. The conductive layer 223 may include heavily-doped $n^{++}$ Si or low-resistance ITO.

In the modulation unit 220 having the above-described structure, when a driver applies a voltage to the first and second cladding layers 222a and 222b, a carrier density in the first and second cladding layers 222a and 222b changes at an interface between the first and second cladding layers 222a and 222b and the waveguide 221. Refractive indices of the first and second cladding layers 222a and 222b change according to the change in the carrier density. When the refractive indices of the first and second cladding layers 222a and 222b change, a phase of a laser beam passing through the waveguide 221 between the first and second cladding layers 222a and 222b may be modulated by evanescent wave interference. Although an example in which the conductive layer 223 is disposed on the upper surface of the first cladding layer 222a has been described above, the conductive layer 223 may not be disposed on the upper surface of the first cladding layer 222a.

Figure 10:
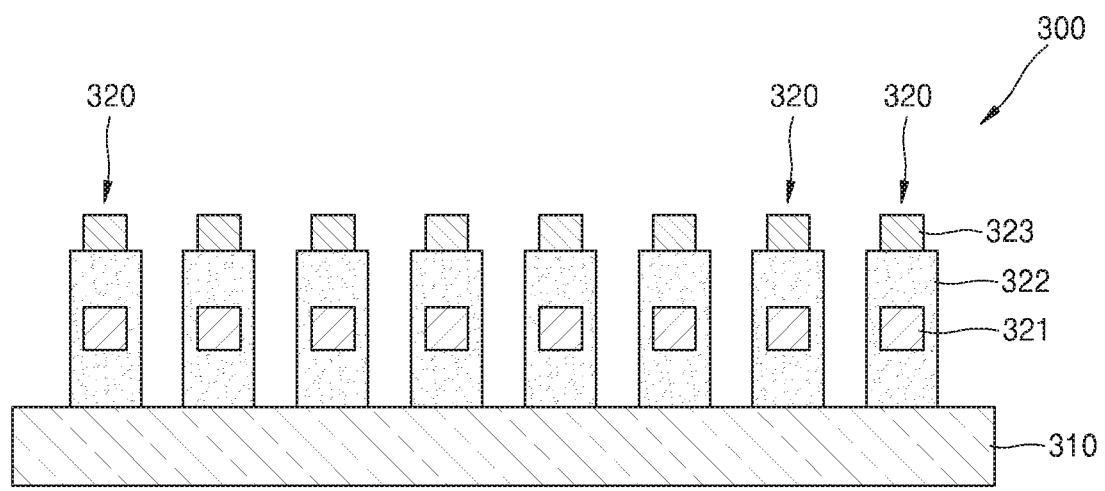
FIG. 10 is a cross-sectional view of a laser beam steering device according to another example embodiment.

FIG. 10 is a cross-sectional view of a laser beam steering device 300 according to another example embodiment.

Referring to FIG. 10, the laser beam steering device 300 may include a plurality of modulation units 320 that are one-dimensionally arranged in parallel on a substrate 310. Each of the modulation units 320 may include the waveguide 321, a cladding layer 322, and a conductive layer 323 on the substrate 310. The cladding layer 322 surrounds the waveguide 321, and the conductive layer 323 is disposed on an upper surface of the cladding layer 322.

The substrate 310 may be a silicon substrate, but embodiments of the present disclosure are not limited thereto. The waveguide 321 may include, for example, a semiconductor material such as silicon, but embodiments of the present disclosure are not limited thereto.

The cladding layer 322 is disposed on the substrate 310 to surround the waveguide 321. The cladding layer 322 is provided for modulating a phase of a laser beam passing through the waveguide 321 and may include a material having a refractive index that changes according to an electric signal applied thereto. The cladding layer 322 may include, for example, an oxide semiconductor. Specifically, the cladding layer 322 may include TCO including at least one selected from ITO, IZO, GIZO, AZO, GZO, and ZnO. However, embodiments of the present disclosure are not limited thereto. The cladding layer 322 may form a p-n junction structure with the waveguide 321.

The conductive layer 323 may include, for example, a metal material including at least one selected from Ag, Au, Al, and Pt. Also, the conductive layer 323 may include heavily-doped $n^{++}$ Si or low-resistance ITO.

In the modulation unit 320 having the above-described structure, when a driver applies a voltage to the cladding layer 322, a carrier density in the cladding layer 322 changes. The refractive index of the cladding layer 322 changes according to the change in the carrier density. When the refractive index of the cladding layer 322 changes, a phase of a laser beam passing through the waveguide 321 surrounded by the cladding layer 322 may be modulated by evanescent wave interference. Although an example in which the conductive layer 323 is disposed on the upper surface of the cladding layer 322 has been described above, the conductive layer 323 may not be disposed on the upper surface of the cladding layer 322.

Figure 11:
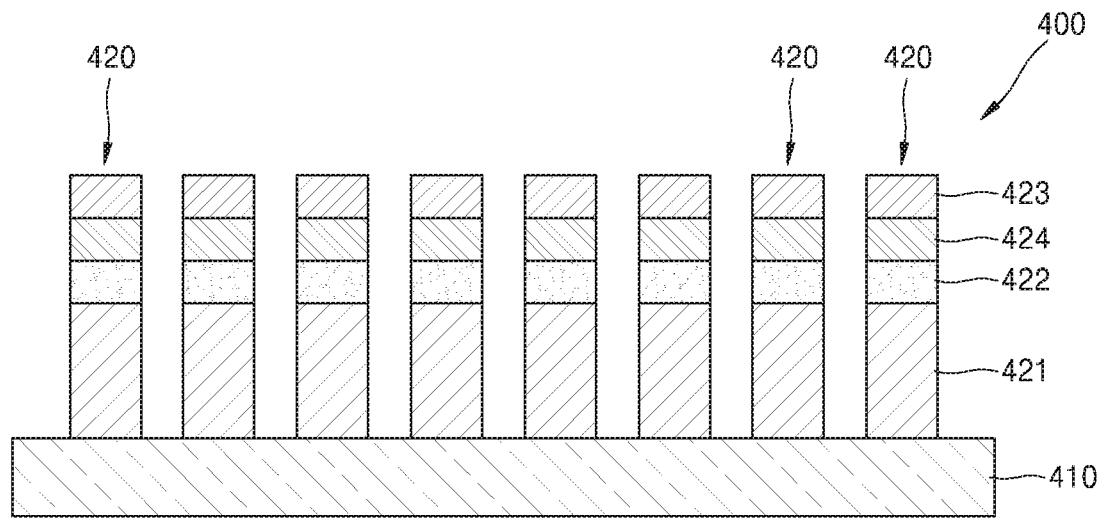
FIG. 11 is a cross-sectional view of a laser beam steering device according to another example embodiment.

FIG. 11 is a cross-sectional view of a laser beam steering device 400 according to another example embodiment.

Referring to FIG. 11, the laser beam steering device 400 may include a plurality of modulation units 420 that are one-dimensionally arranged in parallel on a substrate 410. Each of the modulation units 420 may include a waveguide 421, a cladding layer 422, an insulating layer 424, and a conductive layer 423 disposed on the substrate 410.

The substrate 410 may be a silicon substrate, but embodiments of the present disclosure are not limited thereto. The waveguide 421 is arranged on the substrate 410. The waveguide 421 may include a semiconductor material. For example, the waveguide 421 may include silicon, but embodiments of the present disclosure are not limited thereto.

The cladding layer 422 is disposed on an upper surface of the waveguide 421. The cladding layer 422 is provided for modulating a phase of a laser beam passing through the waveguide 421 and may include a material having a refractive index that changes according to an electric signal applied thereto. The cladding layer 422 may include, for example, an oxide semiconductor. Specifically, the cladding layer 422 may include TCO including at least one selected from ITO, IZO, GIZO, AZO, GZO, and ZnO.

The insulating layer 424 is disposed on an upper surface of the cladding layer 422. The insulating layer 424 may include various types of insulating materials. For example, the insulating layer 424 may include silicon oxide, silicon nitride, $Al_2O_3$, $ZrO_2$, or $HfO_2$, but embodiments of the present disclosure are not limited thereto. The conductive layer 423 is disposed on an upper surface of the insulating layer 424. The conductive layer 423 may include, for example, a metal material including at least one selected from Ag, Au, Al, and Pt. Also, the conductive layer 423 may include heavily-doped $n^{++}$ Si or low-resistance ITO.

In the modulation unit 420 having the above-described structure, the conductive layer 423, the insulating layer 424, the cladding layer 422, and the waveguide 421 may form a metal-oxide semiconductor (MOS) structure. When a driver applies a voltage to the cladding layer 422 through the conductive layer 423, a carrier density in the cladding layer 422 changes. The refractive index of the cladding layer 422 changes according to the change in the carrier density. When the refractive index of the cladding layer 422 changes, a phase of a laser beam passing through the waveguide 421 under the cladding layer 422 may be modulated by evanescent wave interference. Although an example in which the cladding layer 422 is disposed on the upper surface of the waveguide 421 has been described above, the cladding layer 422 may be additionally disposed on the waveguide 421. Alternatively, the cladding layer 422 may be disposed to surround the waveguide 421.

Figure 12:
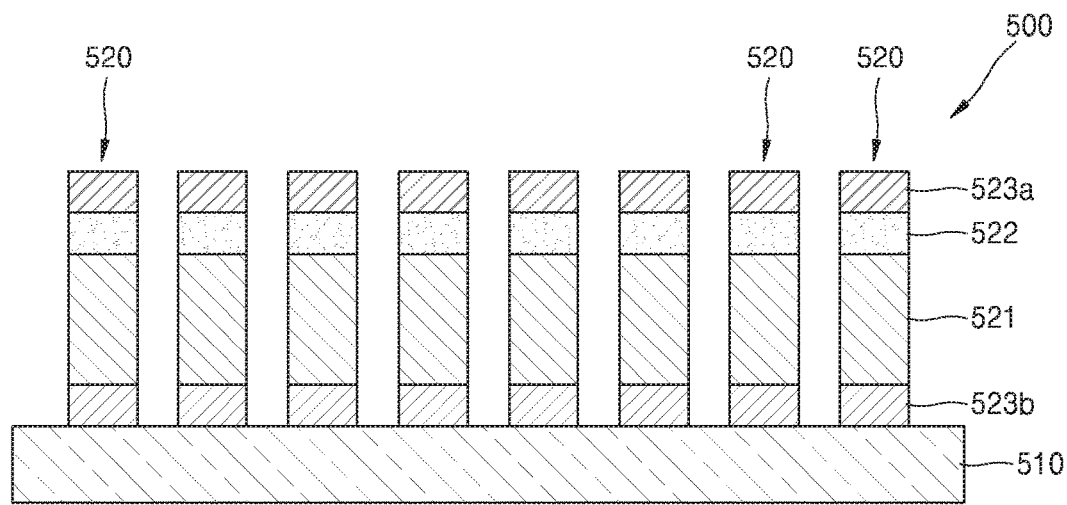
FIG. 12 is a cross-sectional view of a laser beam steering device according to another example embodiment.

FIG. 12 is a cross-sectional view of a laser beam steering device 500 according to another example embodiment.

Referring to FIG. 12, the laser beam steering device 500 may include a plurality of modulation units 520 that are one-dimensionally arranged in parallel on a substrate 510. Each of the modulation units 520 may include a waveguide 521, a cladding layer 522, and first and second conductive layers 523a and 523b disposed on the substrate 510. The cladding layer 522 is disposed on an upper surface of the waveguide 521. The first conductive layer 523a is disposed on an upper surface of the cladding layer 522, and the second conductive layer 523b is disposed on a lower surface of the waveguide 521.

The substrate 510 may be a silicon substrate, but embodiments of the present disclosure are not limited thereto. The waveguide 521 may be a path through which a laser beam passes. In the present example embodiment, the waveguide 521 may include an insulating material. For example, the waveguide 521 may include silicon nitride, but embodiments of the present disclosure are not limited thereto. The waveguide 521 may include other various insulating materials.

The cladding layer 522 is provided for modulating a phase of a laser beam passing through the waveguide 521 and may include a material having a refractive index that changes according to an electric signal applied thereto. For example, the cladding layer 522 may include an oxide semiconductor. Specifically, the cladding layer 522 may include TCO including at least one selected from ITO, IZO, GIZO, AZO, GZO, and ZnO.

The first conductive layer 523a may include, for example, a metal material including at least one selected from Ag, Au, Al, and Pt. Also, the first conductive layer 523a may include heavily-doped $n^{++}$ Si or low-resistance ITO. The second conductive layer 523b may serve as an electrode configured to apply a voltage to the cladding layer 522. Like the first conductive layer 523a, the second conductive layer 523b may include a metal material, heavily-doped $n^{++}$ Si, or low-resistance ITO.

In the modulation unit 520 having the above-described structure, the waveguide 521 including an insulating material such as silicon nitride may serve as an insulating film in a MOS structure for changing a refractive index of the cladding layer 522. When a driver applies a voltage to the cladding layer 522, a carrier density in the cladding layer 522 changes. The refractive index of the cladding layer 522 changes according to the change in the carrier density. When the refractive index of the cladding layer 522 changes, a phase of a laser beam passing through the waveguide 521 under the cladding layer 522 may be modulated by evanescent wave interference.

Figure 13:
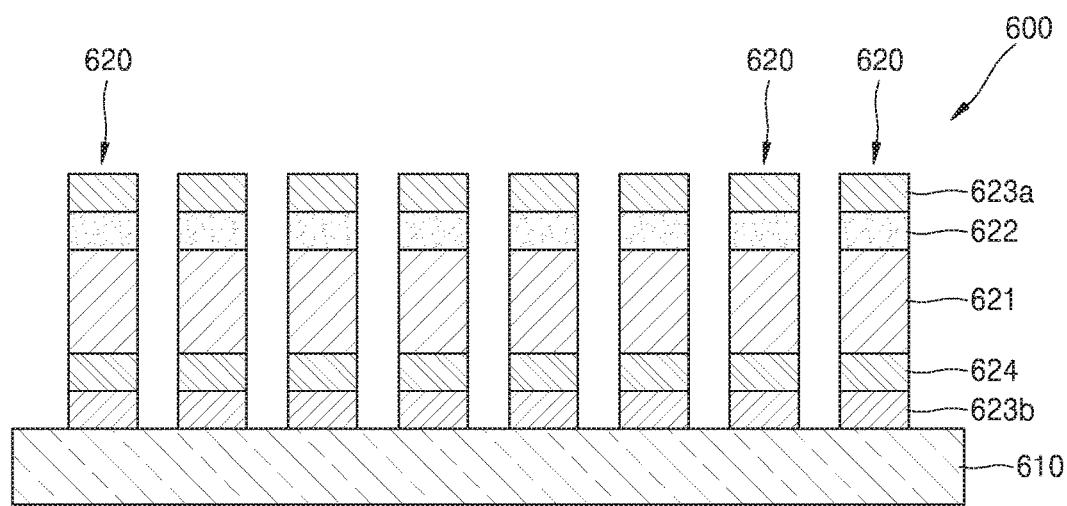
FIG. 13 is a cross-sectional view of a laser beam steering device according to another example embodiment.

FIG. 13 is a cross-sectional view of a laser beam steering device 600 according to another example embodiment.

Referring to FIG. 13, the laser beam steering device 600 may include a plurality of modulation units 620 that are one-dimensionally arranged on a substrate 610. Each of the modulation units 620 may include a waveguide 621, a cladding layer 622, an insulating layer 624, and first and second conductive layers 623a and 623b disposed on the substrate 610. The cladding layer 622 is disposed on an upper surface of the waveguide 621, and the insulating layer 624 is disposed on a lower surface of the waveguide 621. The first conductive layer 623a is disposed on an upper surface of the cladding layer 622, and the second conductive layer 623b is disposed on a lower surface of the insulating layer 624.

The substrate 610 may be a silicon substrate, but embodiments of the present disclosure are not limited thereto. The waveguide 621 may include an insulating material. For example, the waveguide 621 may include silicon nitride, but embodiments of the present disclosure are not limited thereto. The waveguide 621 may include other various insulating materials.

The cladding layer 622 may include, for example, an oxide semiconductor. Specifically, the cladding layer 622 may include TCO including at least one selected from ITO, IZO, GIZO, AZO, GZO, and ZnO.

The first conductive layer 623a may include, for example, a metal material including at least one selected from Ag, Au, Al, and Pt. Also, the first conductive layer 623a may include heavily-doped $n^{++}$ Si or low-resistance ITO. The insulating layer 624 may reduce loss of a laser beam confined in the waveguide 621. The insulating layer 624 may include silicon oxide, silicon nitride, $Al_2O_3$, $ZrO_2$, or $HfO_2$, but embodiments of the present disclosure are not limited thereto. The insulating layer 624 may include other various materials.

The second conductive layer 623b may serve as an electrode configured to apply a voltage to the cladding layer 622. Like the first conductive layer 623a, the second conductive layer 623b may include a metal material, heavily-doped $n^{++}$ Si, or low-resistance ITO.

In the modulation unit 620 having the above-described structure, the waveguide 621 including an insulating material such as silicon nitride may serve as an insulating film in a MOS structure for changing a refractive index of the cladding layer 622. When a driver applies a voltage to the cladding layer 622, a carrier density in the cladding layer 622 changes. The refractive index of the cladding layer 622 changes according to the change in the carrier density. When the refractive index of the cladding layer 622 changes, a phase of a laser beam passing through the waveguide 621 under the cladding layer 622 may be modulated.

Figure 14:
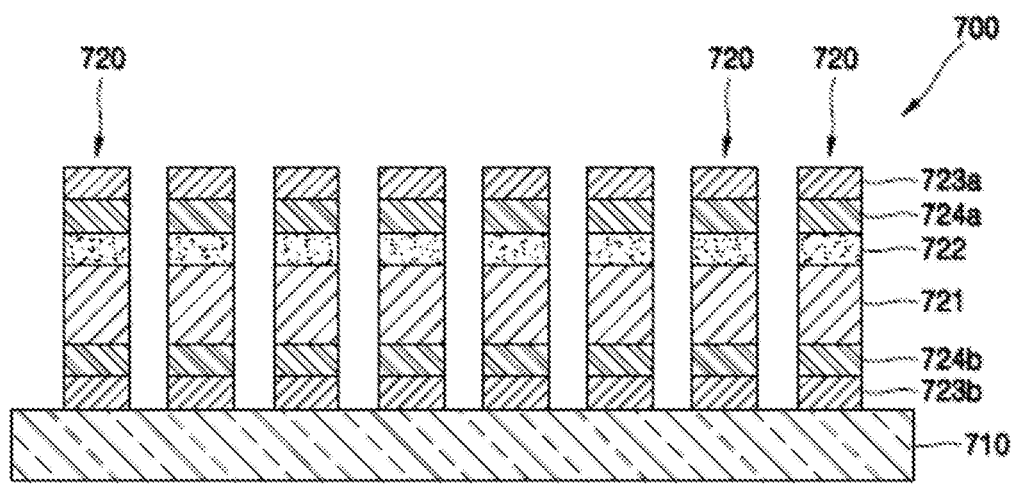
FIG. 14 is a cross-sectional view of a laser beam steering device according to another example embodiment.

FIG. 14 is a cross-sectional view of a laser beam steering device 700 according to another example embodiment.

Referring to FIG. 14, the laser beam steering device 700 may include a plurality of modulation units 720 that are one-dimensionally arranged in parallel on a substrate 710. Each of the modulation units 720 may include a waveguide 721, a cladding layer 722, first and second insulating layers 724a and 724b, and first and second conductive layers 723a and 723b disposed on the substrate 710. The cladding layer 722 is disposed on an upper surface of the waveguide 721. The first insulating layer 724a is disposed on an upper surface of the cladding layer 722, and the second insulating layer 724b is disposed on a lower surface of the waveguide 721. The first conductive layer 723a is disposed on the first insulating layer 724a, and the second conductive layer 723b is disposed on a lower surface of the second insulating layer 724b.

The substrate 710 may be a silicon substrate, but embodiments of the present disclosure are not limited thereto. The waveguide 721 may include an insulating material. For example, the waveguide 721 may include silicon nitride, but embodiments of the present disclosure are not limited thereto. The cladding layer 722 is disposed on the upper surface of the waveguide 721. The cladding layer 722 may include, for example, an oxide semiconductor. Specifically, the cladding layer 722 may include TCO including at least one selected from ITO, IZO, GIZO, AZO, GZO, and ZnO.

The first insulating layer 724a may include various types of insulating materials. For example, the first insulating layer 724a may include silicon oxide, silicon nitride, $Al_2O_3$, $ZrO_2$, or $HfO_2$, but embodiments of the present disclosure are not limited thereto. The first conductive layer 723a may include, for example, a metal material including at least one selected from Ag, Au, Al, and Pt. Also, the first conductive layer 723a may include heavily-doped $n^{++}$ Si or low-resistance ITO.

Like the first insulating layer 724a, the second insulating layer 724b may include silicon oxide, silicon nitride, $Al_2O_3$, $ZrO_2$, or $HfO_2$, but embodiments of the present disclosure are not limited thereto. Like the first conductive layer 723a, the second conductive layer 723b may include a metal material, heavily-doped $n^{++}$ Si, or low-resistance ITO.

In the modulation unit 720 having the above-described structure, when a driver applies a voltage to the cladding layer 722, a carrier density in the cladding layer 722 changes. The refractive index of the cladding layer 722 changes according to the change in the carrier density. When the refractive index of the cladding layer 722 changes, a phase of a laser beam passing through the waveguide 721 under the cladding layer 722 may be modulated.

As described above in the example embodiments, the laser beam steering device includes the plurality of modulation units that are one-dimensionally arranged on the substrate, and each of the modulation units includes the cladding layer that is arranged around the waveguide through which the laser beam passes, wherein the refractive index of the cladding layer changes according to the electrical signal applied thereto. The phase of the laser beam passing through the waveguide may be modulated by changing the refractive index of the cladding layer. As such, since the phases of the laser beams passing through the waveguides are modulated by the modulation units, a phase profile of the bundle of finally emitted laser beams is determined, and a traveling direction of the laser beam is determined according to the determined phase profile. Thus, the laser beam may be emitted toward a desired position.

According to the above-described example embodiments, beam loss is small since the refractive index of the waveguide itself is not changed, and laser beams having various wavelengths may be steered since various materials such as silicon or silicon nitride may be used as a material for the waveguide. Also, since an electrical signal is used instead of heat, speed is high and a gap between the waveguides may be reduced, thereby securing a wide FOV. Since the cladding layer is made of an oxide semiconductor such as ITO, it is possible to improve phase modulation efficiency and thus shorten a phase modulation section.

Figure 15:
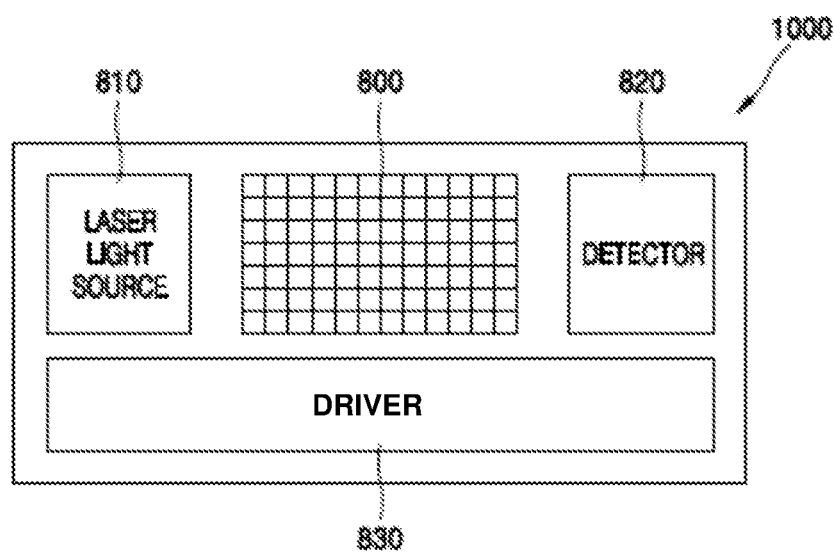
FIG. 15 is a cross-sectional view of a system including a laser beam steering device, according to an example embodiment.

FIG. 15 is a cross-sectional view of a system 1000 according to an example embodiment. Specifically, FIG. 15 schematically illustrates the system 1000 including the laser beam steering device according to the above-described example embodiments.

Referring to FIG. 15, the system 1000 according to the example embodiment may include a laser light source 810 configured to emit a laser beam, a laser beam steering device 800 configured to steer the laser beam, a detector 820 configured to detect the steered laser beam, and a driver 830. The driver 830 may include a driving circuit configured to drive the laser light source 810, the laser beam steering device 800, and the detector 820.

A laser diode may be used as the laser light source 810. However, this is merely an example, and various light sources may be used as the laser light source 810. The laser beam emitted by the laser light source 810 is incident on the laser beam steering device 800. The laser beam steering device 800 steers the incident laser beam toward a desired position. As described above, the laser beam steering device 800 may include one or more of the laser beam steering devices 100, 200, 300, 400, 500, 600, and 700 according to the above-descried example embodiments. When the laser beam steered by the laser beam steering device 800 is irradiated on and reflected from an object, the detector 820 may detect the reflected laser beam. The system 1000 including the laser beam steering device 800 may be applied to various fields, such as a depth sensor, a three-dimensional (3D) sensor, a light detection and ranging (LiDAR), and the like.

As described above, the laser beam steering device includes the cladding layer arranged around the waveguide through which the laser beam passes, wherein the refractive index of the cladding layer changes according to the electrical signal applied to. The phase of the laser beam passing through the waveguide may be modulated by changing the refractive index of the cladding layer. Beam loss is small since the refractive index of the waveguide itself is not changed, and laser beams having various wavelengths may be steered since various materials such as silicon or silicon nitride may be used as a material for the waveguide. Also, since the electrical signal is used instead of heat, speed is high and a gap between the waveguides may be reduced, thereby securing a wide FOV. Since the cladding layer is made of an oxide semiconductor such as ITO, it is possible to improve phase modulation efficiency and thus shorten a phase modulation section.

It should be understood that example embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A laser beam steering device comprising:
a waveguide configured to guide a laser beam which passes through the waveguide; and
a cladding layer disposed on the waveguide and having a refractive index which changes according to an electrical signal applied to the cladding layer,
wherein the cladding layer modulates a phase of the laser beam passing through the waveguide by a change of the refractive index of the cladding layer.

2. The laser beam steering device of claim 1, further comprising a first conductive layer disposed on the waveguide.

3. The laser beam steering device of claim 2, wherein the cladding layer is disposed between the waveguide and the first conductive layer.

4. The laser beam steering device of claim 2, further comprising an insulating layer disposed between the cladding layer and the first conductive layer.

5. The laser beam steering device of claim 2, further comprising a second conductive layer disposed under the waveguide, wherein the first conductive layer is disposed over the waveguide.

6. The laser beam steering device of claim 5, further comprising an insulating layer disposed between the waveguide and the second conductive layer.

7. The laser beam steering device of claim 5, further comprising:
a first insulating layer disposed between the cladding layer and the first conductive layer; and
a second insulating layer disposed between the waveguide and the second conductive layer.

8. The laser beam steering device of claim 1, further comprising an insulating layer disposed on the cladding layer.

9. The laser beam steering device of claim 1, wherein the cladding layer comprises:
a first cladding layer disposed on an upper surface of the waveguide; and
a second cladding layer disposed on a lower surface of the waveguide.

10. The laser beam steering device of claim 1, wherein the cladding layer surrounds the waveguide.

11. The laser beam steering device of claim 1, wherein the cladding layer comprises an oxide semiconductor.

12. The laser beam steering device of claim 1, wherein the waveguide comprises silicon or silicon nitride.

13. A laser beam steering device comprising:
a plurality of modulation units, each of the plurality of modulation units comprising:
a waveguide configured to guide a laser beam which passes through the waveguide; and
a cladding layer disposed on the waveguide and having a refractive index which changes according to an electrical signal applied to the cladding layer,
wherein the cladding layer modulates a phase of the laser beam passing through the waveguide by a change of the refractive index of the cladding layer.

14. The laser beam steering device of claim 13, further comprising a substrate on which the plurality of modulation units are one-dimensionally arranged.

15. The laser beam steering device of claim 14, wherein the plurality of modulation units are configured to steer the laser beam by forming a phase profile changing according to time.

16. The laser beam steering device of claim 13, wherein each of the plurality of modulation units further comprises a first conductive layer disposed on the cladding layer.

17. The laser beam steering device of claim 16, wherein each of the plurality of modulation units further comprises a second conductive layer disposed under the waveguide.

18. The laser beam steering device of claim 13, wherein each of the plurality of modulation units further comprises an insulating layer disposed on the cladding layer.

19. A system comprising:
a laser light source configured to emit a laser beam;
a laser beam steering device configured to steer the laser beam emitted by the laser light source; and
a detector configured to detect the laser beam steered by the laser beam steering device,
wherein the laser beam steering device comprises a plurality of modulation units, each of the plurality of modulation units comprising:
a waveguide configured to guide the laser beam which passes through the waveguide; and
a cladding layer disposed on the waveguide and having a refractive index which changes according to an electrical signal applied to the cladding layer,
wherein the cladding layer modulates a phase of the laser beam passing through the waveguide by a change of the refractive index of the cladding layer.

20. The system of claim 19, wherein the laser beam steering device further comprises a plurality of beam splitters configured to split the laser beam emitted by the laser light source into a plurality of laser beams and input the plurality of laser beams to the plurality of modulation units.

* * * * *